(No Model.)
A. P. LAURSÉN.
CALIPERS AND DIVIDERS.
No. 433,869. Patented Aug. 5, 1890.
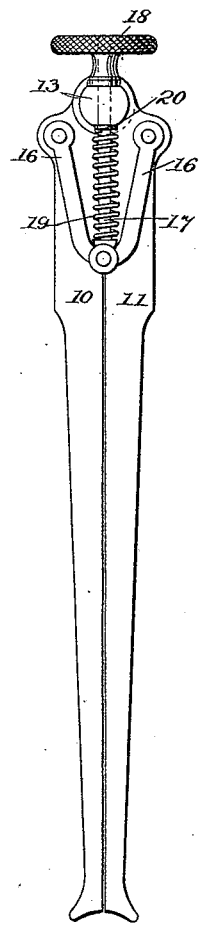
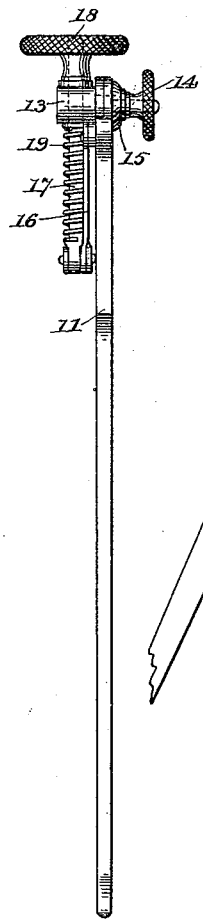
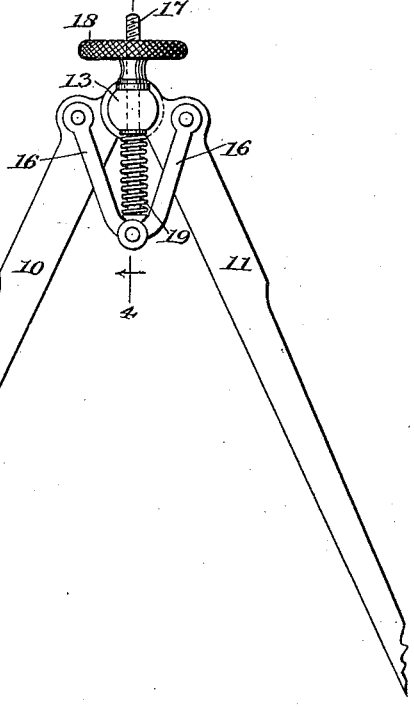
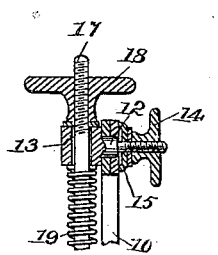
WITNESSES:
J. A. E. Criswell
C. Sedgwick
INVENTOR:
A. P. Laursen
BY
Munn & Co
ATTORNEYS

UNITED STATES PATENT OFFICE.

ANDERS P. LAURSEN, OF PASSAIC, NEW JERSEY.

CALIPERS AND DIVIDERS.

SPECIFICATION forming part of Letters Patent No. 433,869, dated August 5, 1890.

Application filed January 27, 1890. Serial No. 338,186. (No model.)

*To all whom it may concern:*

Be it known that I, ANDERS P. LAURSEN, of Passaic, in the county of Passaic and State of New Jersey, have invented a new and useful Improvement in Calipers and Dividers, of which the following is a full, clear, and exact description.

My invention relates to an improvement in calipers and dividers, and has for its object to provide for a rapid, simple, and convenient adjustment, and also to dispense with any protuberances upon the sides of the legs, whereby the devices may be most effectually employed as inside calipers or dividers.

A further object of the invention is to so construct the device that it will be very durable and may be manufactured at a minimum cost.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of a pair of calipers constructed in accordance with my invention and in a closed position. Fig. 2 is an edge view of the calipers. Fig. 3 is a side elevation thereof when opened out, and Fig. 4 is a section taken practically upon the line 4 4 of Fig. 3.

The legs 10 and 11 of the calipers or dividers may be of any desired shape, and may be constructed of any desired material, and the said legs are pivotally connected at their upper ends by a stud 12, constituting an integral portion of a sleeve or socket 13, the said stud being made of sufficient length to project beyond one face of the calipers, and when it is attached to the sleeve or socket has a bearing against the opposite face. The outer projecting end of the stud 12 is threaded to receive a check-nut 14, which nut has a bearing against a washer 15, the said washer being placed upon the stud between the check-nut and the opposed face of the caliper-legs.

At or near the upper end of each leg 10 and 11 one end of a link 16 is pivoted, the lower ends of said links being pivotally connected, as illustrated in Figs. 1 and 3. These links 16 are adapted to act in the capacity of levers when employed in connection with a set-rod 17, which rod is made to pass downward through the socket 13, and the lower end of said rod is securely fastened to the levers 16 at their lower or pivotally-connected ends. The upper end of the rod, which extends beyond the top surface of the socket, is threaded, and upon this threaded end a thumb-nut 18 is screwed, which has a bearing upon the said upper face of the socket.

Around the set-rod, between the under face of the socket 13 and the opposed or contiguous surfaces of the levers 16, a spring 19 is coiled, which spring has a bearing against the lower ends of the levers 16 at one extremity, and preferably an upper bearing against a washer 20, which washer contacts with the under surface of the socket 13.

In operation when the thumb-screw 18 is run up upon the set-rod 17 the spring 19 acts to immediately force the legs 10 and 11 of the calipers or dividers together, and when the said thumb-nut is screwed downward upon the rod as soon as it touches the upper surface of the socket 13 the rod 17 is drawn upward, compressing the spring 19, and elevates the lower ends of the levers 16, which being pivotally connected with the two legs 10 and 11 cause the said legs to separate. When the desired distance has been attained between the legs of the calipers or dividers, they may be quickly and conveniently fixed in such position by screwing the check-nut 14 to a firm bearing against the face of the calipers at their pivotal point.

It will be readily observed that the device may be very expeditiously set, and that none of the adjusting or check screws are placed in such a position as to interfere with the effective use of the calipers or dividers under any and all conditions.

Having thus described my invention, I claim as new and desire to secure by Letters Patent—

1. The combination, with the legs of calipers and dividers or similar devices, of levers pivoted at one end to the said legs and at the other end to each other, a guide-socket located at and forming a portion of the pivot of the legs, an adjusting-rod held to slide in said guide-socket and attached to the levers, a spring coiled around the said adjusting-rod between the levers and the said guide-socket, and check-nuts also located at the pivotal connection of the legs, substantially as specified.

2. The combination, with the legs of calipers and dividers or similar devices and levers pivoted to said legs and to one another, of a socket having an attached threaded stud constituting the pivot-pin of the legs, a check-nut screwed upon said stud, an adjusting-screw passed through the socket and secured to the lower ends of the levers, a spring coiled around the said adjusting-rod between the socket and the levers, and a thumb-nut screwed upon the upper end of the adjusting-rod, substantially as shown and described, and for the purpose specified.

ANDERS P. LAURSEN.

Witnesses:
JULIUS HANSEN,
LOUIS MÜLLER.